(12) United States Patent
Rozenwald et al.

(10) Patent No.: US 8,880,485 B2
(45) Date of Patent: Nov. 4, 2014

(54) SYSTEMS AND METHODS TO FACILITATE MULTI-THREADED DATA RETRIEVAL

(75) Inventors: Guy Rozenwald, Ranana (IL); Uri Haham, Karkur (IL); Tal Kellner, Hertzlia (IL)

(73) Assignee: SAP SE, Walldorf (DE)

( * ) Notice: Subject to any disclaimer, the term of this patent is extended or adjusted under 35 U.S.C. 154(b) by 844 days.

(21) Appl. No.: 13/075,507

(22) Filed: Mar. 30, 2011

(65) Prior Publication Data

US 2012/0254137 A1    Oct. 4, 2012

(51) Int. Cl.
 G06F 17/00    (2006.01)
 G06F 17/30    (2006.01)

(52) U.S. Cl.
 CPC .... G06F 17/30445 (2013.01); G06F 17/30545 (2013.01)
 USPC .......... 707/700; 707/713; 707/736; 707/758; 712/32; 712/203; 718/100

(58) Field of Classification Search
 None
 See application file for complete search history.

(56) References Cited

U.S. PATENT DOCUMENTS

| | | | |
|---|---|---|---|
| 2,092,062 A * | 9/1937 | Halliburton | 166/148 |
| 6,073,131 A * | 6/2000 | Roberti | 1/1 |
| 6,211,219 B1 * | 4/2001 | MacLeod et al. | 514/383 |
| 7,444,329 B2 * | 10/2008 | Harris et al. | 1/1 |
| 7,917,512 B2 * | 3/2011 | Bhide et al. | 707/737 |
| 8,001,109 B2 * | 8/2011 | Lohman et al. | 707/713 |
| 2004/0122845 A1 * | 6/2004 | Lohman et al. | 707/102 |
| 2006/0190947 A1 * | 8/2006 | Ghosh et al. | 719/313 |
| 2007/0088706 A1 * | 4/2007 | Goff | 707/10 |
| 2007/0106666 A1 * | 5/2007 | Beckerle et al. | 707/7 |
| 2007/0203882 A1 * | 8/2007 | Koseki et al. | 707/2 |
| 2008/0106666 A1 * | 5/2008 | Lee et al. | 349/48 |
| 2008/0184232 A1 * | 7/2008 | Clark et al. | 718/100 |
| 2008/0270758 A1 * | 10/2008 | Ozer et al. | 712/206 |
| 2009/0055352 A1 * | 2/2009 | Corvinelli et al. | 707/2 |
| 2009/0144303 A1 * | 6/2009 | Bhide et al. | 707/101 |
| 2009/0150336 A1 * | 6/2009 | Basu et al. | 707/2 |
| 2009/0178054 A1 * | 7/2009 | Chen et al. | 718/106 |
| 2010/0114976 A1 * | 5/2010 | Castellanos et al. | 707/803 |
| 2011/0047144 A1 * | 2/2011 | Han et al. | 707/718 |
| 2012/0190421 A1 * | 7/2012 | Ruppert et al. | 463/17 |
| 2012/0191639 A1 * | 7/2012 | Katahira et al. | 706/50 |
| 2013/0166886 A1 * | 6/2013 | Sasanka et al. | 712/216 |

* cited by examiner

*Primary Examiner* — Hung Le
(74) *Attorney, Agent, or Firm* — Buckley, Maschoff & Talwalkar LLC

(57) ABSTRACT

According to some embodiments, a data source is accessed from which data will be retrieved via a plurality of processing threads. The data source may have, for example, a plurality of records with each record being associated with a plurality of identifiers. Each of the plurality of identifiers may be dynamically evaluated as a potential range identifier, and the evaluation may be based at least in part on a number of distinct values present within each identifier. One of the potential range identifiers may be selected as a selected range identifier, and the plurality of records may be divided into ranges defined using the selected range identifier.

16 Claims, 8 Drawing Sheets

|  | STRUCTURE ID | AGENCY ID | RECORD ID |
| --- | --- | --- | --- |
| COUNT (DISTINCT) | 10 | 5 | 50,000 |
| MAX | 100 | 20 | 50,001 |
| MIN | 0 | 0 | 0 |
| RANGE SIZE (8 THREADS) | 11.1111 | 2.2222 | 5,555.6667 |
| NUMBER OF RANGES | 1 | 3 | 5,556 |
| IDS PER RANGE | 10 | 2 | 5,556 |
| RECORDS PER ID | 20,000 | 40,000 | 4 |
| RECORDS PER RANGE | 200,000 | 80,000 | 22,224 |

FIG. 5

SYSTEMS AND METHODS TO FACILITATE MULTI-THREADED DATA RETRIEVAL

FIELD

Some embodiments relate to data retrieval. More specifically, some embodiments are associated with a multi-threaded retrieval of data based on a dynamic analysis of data distribution in a data source.

BACKGROUND

A business or enterprise may store information about various items in the form of electronic records. For example, a company might have an employee database where each row in the database represents a record containing information about a particular employee (e.g., the employee's name, date of hire, and salary). Moreover, in some cases large amounts of data may need to be retrieved from a data source (e.g., when copying information to a back-up data store). In some cases, a system may simultaneously retrieve and/or process records from the data source using multiple processing threads. Note that two threads may be prevented from accessing a single record 210 at the same time (e.g., to avoid errors or conflicts).

The processing threads may be assigned groups or ranges of records to be retrieved. For example, range 1 might be defined as including data records associated with part numbers "0" through "1,000," range 2 might be defined as including data records associated with part numbers "1,001" through "2,000," etc. Each processing threads may then be assigned to one of ranges and begin to retrieve and/or process the records from that range. When a processing thread has finished retrieving all of the records in its assigned range, it may simply halt or wait.

Note, however, some of the records may be empty or less difficult to process as compared to other records 310. As a result, a processing thread might finish retrieving all of the records it's range before other threads have finished retrieving their records (e.g., because one range had a relatively large number of empty records). This can result in a thread waiting (not performing useful work) and reduce the efficiency of the system.

Accordingly, a method and mechanism for efficiently retrieve data from a data source using multiple processing threads may be provided in accordance with some embodiments described herein.

BRIEF DESCRIPTION OF THE DRAWINGS

FIG. 5 is an example of record identifier information according to some embodiments.

DETAILED DESCRIPTION

Figure 1:
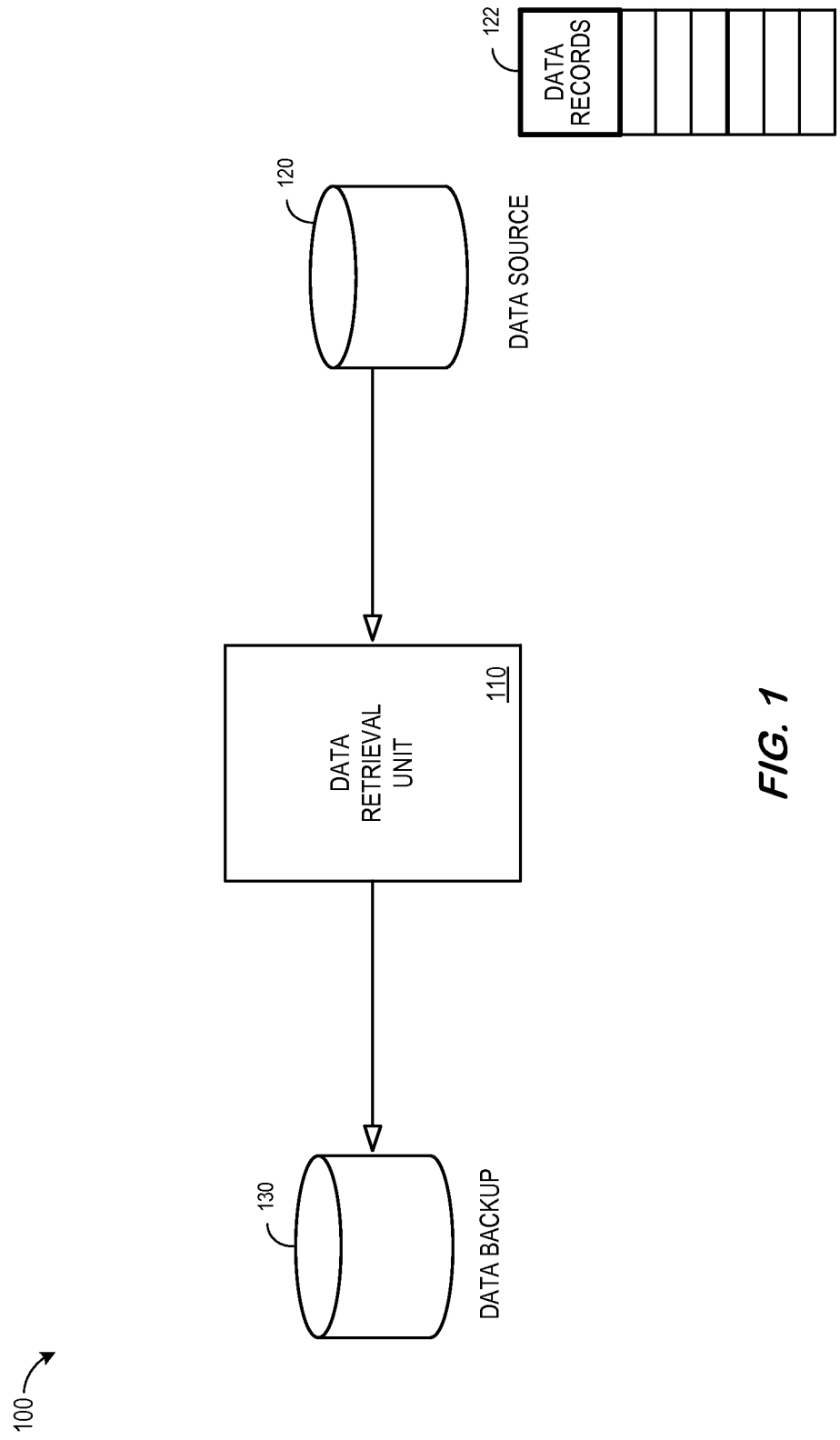
FIG. 1 is a block diagram of a system that might be associated with data retrieval according to some embodiments.

FIG. 1 is a block diagram of a system 100 that might be associated with data retrieval. The system 100 includes at least one data source 120 storing records, each record containing a number of fields (e.g., identifiers and associated business information). Different data sources 120 may, for example, be associated with different business applications. According to some embodiments, one or more data sources might be associated with an Enterprise Resource Planning ("ERP") system. Note that the records might be stored within physical tables 122 of a database. The database may comprise a relational database such as SAP MaxDB, Oracle, Microsoft SQL Server, IBM DB2, Teradata and the like. As another example, the data sources 120 might be associated with a multi-dimensional database, an eXtendable Markup Language ("XML") document, or any other structured data storage system. The physical tables 122 may be distributed among several relational databases, dimensional databases, and/or other data sources.

A data retrieval unit 110 may receive records from the data source 110. For example, the data retrieval unit 110 might retrieve records from a remote data source 120 via HyperText Transport Protocol ("HTTP") communication or any other type of data exchange. The data retrieval unit 110 and/or data source 112 might be associated with, for example, Personal Computers (PC), servers, and/or mobile devices. By way of example, the data retrieval unit 110 might retrieve thousands of records from the data source 120 and store copies of the records in a data backup 130.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
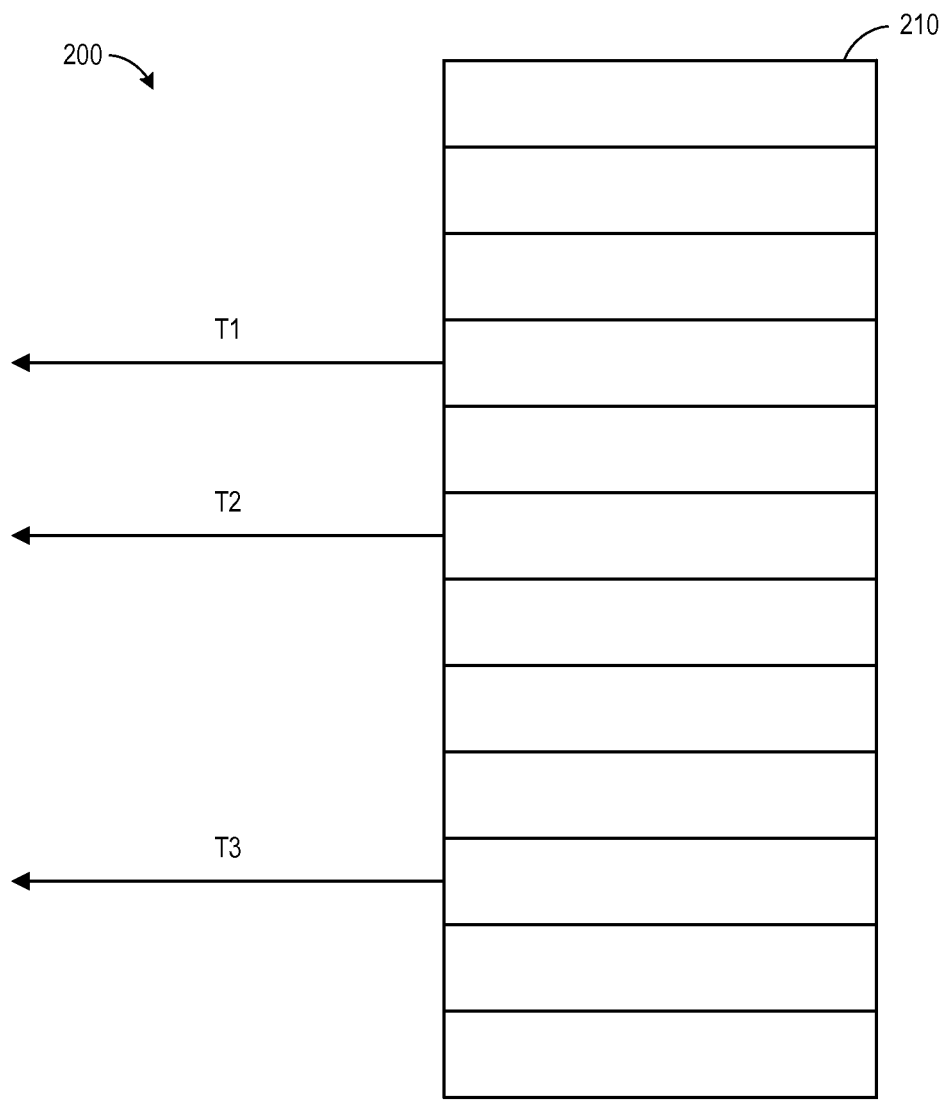
FIG. 2 illustrates multi-threaded data retrieval in accordance with some embodiments.

According to some embodiments, the data retrieval unit 110 is able to simultaneously retrieve and/or process records from the data source using multiple processing threads. For example, FIG. 2 illustrates multi-threaded data retrieval 200 in accordance with some embodiments. In this example, three threads T1 through T3 retrieve records 210 (e.g., stored in a data store). Note that any number of processing threads might be employed (e.g., twenty processing threads might be utilized to retrieve the records 210). Further note that two threads may be prevented from accessing a single record 210 at the same time (e.g., to avoid errors or conflicts).

Figure 3:
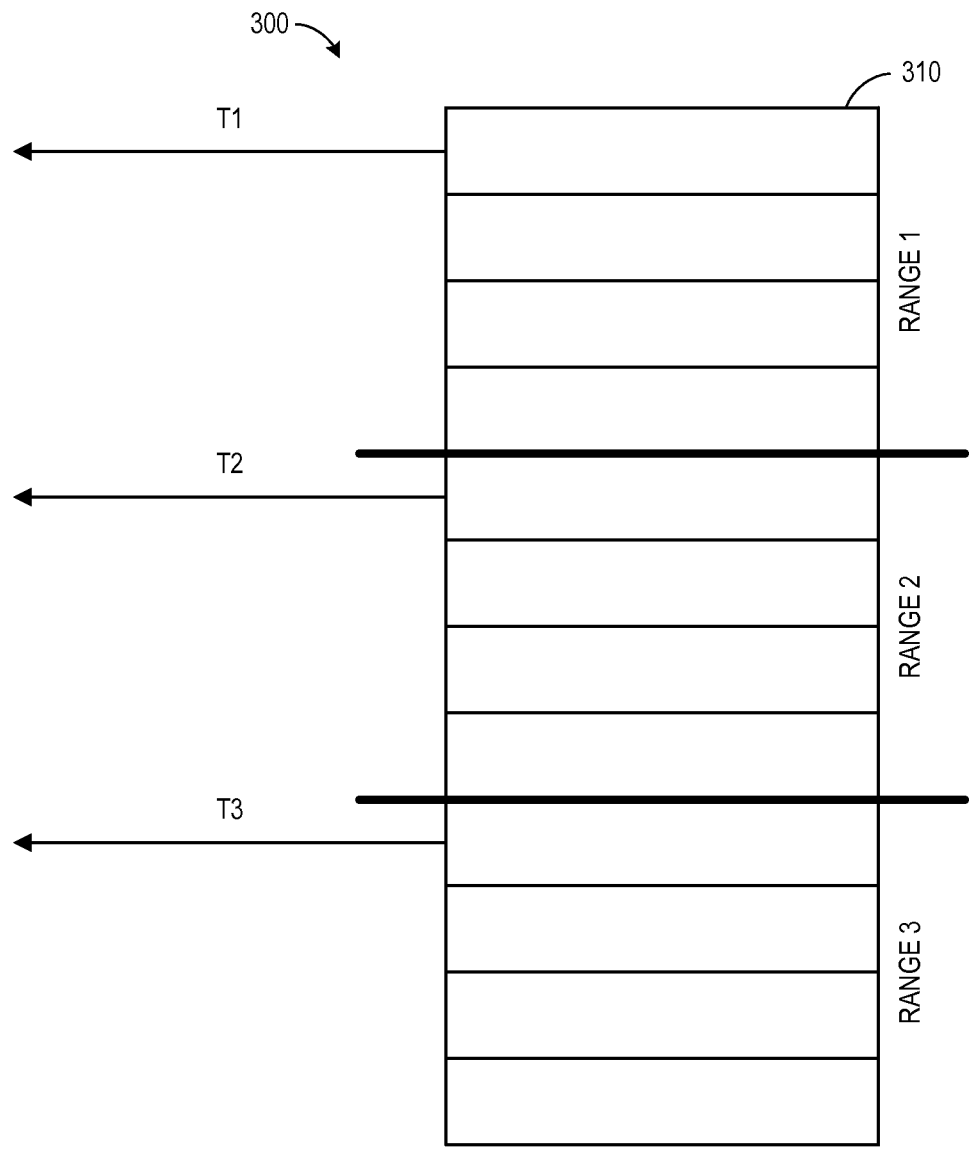
FIG. 3 illustrates multi-threaded data retrieval ranges according to some embodiments.

The processing threads may be assigned groups or ranges of records to be retrieved. FIG. 3 illustrates multi-threaded data retrieval ranges 300 according to some embodiments. In this example, three ranges, each containing four records 310 are defined. In an actual implementation, each range might contain thousands or hundreds of thousands of records 310. According to some embodiments, a range may be defined using an identifier associated with the data records 310. For example, range 1 might be defined as including data records 310 associated with part numbers "0" through "1,000," range 2 might be defined as including data records 310 associated with part numbers "1,001" through "2,000," etc. Note that multiple data records 310 could be associated with a single identifier. For example, ten data records couple be associated with part number "1,500."

Each of the three processing threads T1 through T3 may then be assigned to one of ranges and begin to retrieve and/or process the records 310 from its assigned range. For example, thread T2 might initially retrieve the data record 310 associated with part number "1,001" and, when complete, begin to retrieve the data record 310 associated with part number "1,002." When a processing thread has finished retrieving all of the records 310 in its assigned range, it may simply halt or wait.

Note, however, some of the records 310 may be empty or less difficult to process as compared to other records 310. Similarly, a single identifier (e.g., part number "1,500") could be associated with a large number of data records 310. As a result, processing thread T1 might finish retrieving all of the records 310 in range 1 before threads T2 and T3 have finished retrieving the records 310 in ranges 2 and 3 (e.g., because range 1 had a relatively large number of empty records). This can result in thread T1 waiting and reduce the efficiency of the system.

Figure 4:
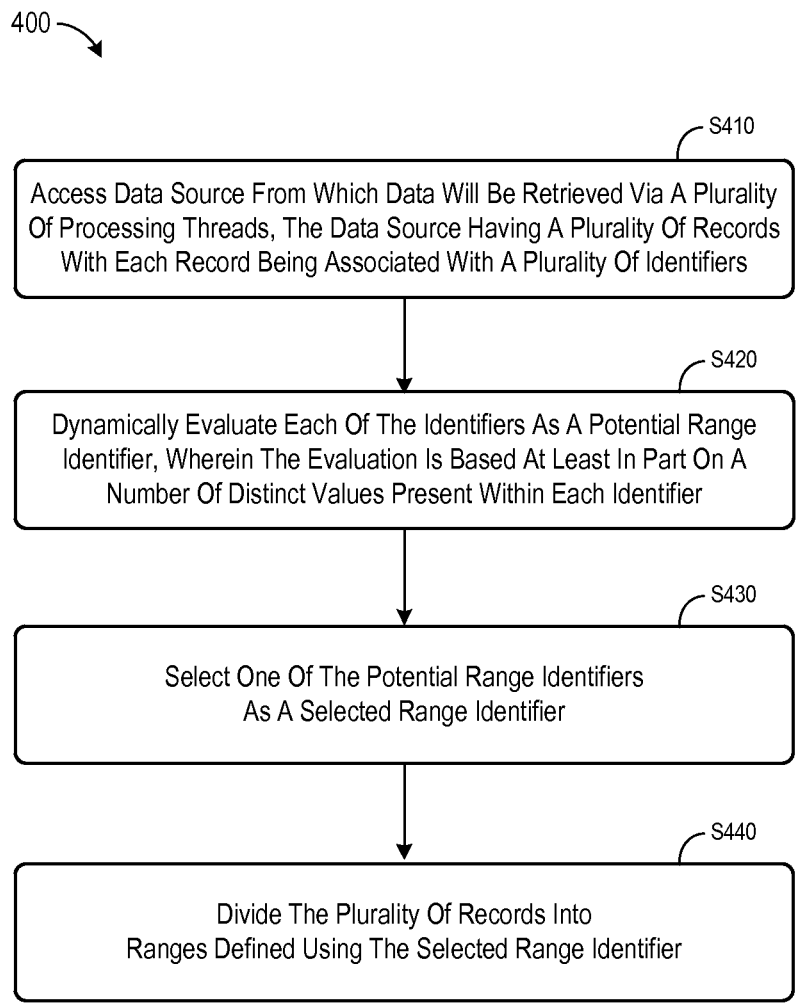
FIG. 4 is a flow diagram of a process according to one embodiment that might be implemented.

To reduce such problems, the data retrieval unit 110 may operate in accordance with any of the embodiments described herein. For example, FIG. 4 is a flow diagram of a process 400 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S410, a data source from which data will be retrieved via a plurality of processing threads may be accessed. The data source may have, for example, a plurality of records with each record being associated with a plurality of identifiers. According to some embodiments, the data source is a table of business information and each of the plurality of potential range identifiers are associated with a table column. Moreover, the data retrieval may be associated with a backup operation for the table records and/or related business information.

At S420, each of the plurality of identifiers may be dynamically evaluated as a potential range identifier, wherein the evaluation is based at least in part on a number of distinct values present within each identifier. At S430, one of the potential range identifiers may be selected as a selected range identifier. For example, according to some embodiments a potential range identifier having the largest number of distinct values may be selected as the selected range identifier.

At S440, the plurality of records may be divided into ranges defined using the selected range identifier. Moreover, a range size for each of the ranges may be calculated based at least in part on the number of processing threads. For example, the range size might equal (a maximum value associated with a potential range identifier−a minimum value associated with the potential range identifier) divided by (the number of processing threads+1). Different processing threads may then be assigned to the different ranges, and data may be simultaneously retrieved from the ranges by executing the plurality of processing threads.

To further describe some embodiments, FIG. 5 is one example 500 of record identifier information according to some embodiments. In this example, a data source has 200,000 records with uniform identifier distribution (in all columns). According to some embodiments, the efficiency of data retrieval may be improved as a result of a dynamic diagnosis of the data.

Note that different data distributions and/or different numbers of threads working on the table may be considered, and that the total number of records in the table is not the only factor (e.g., a number of LOB columns may also be taken into account). Since fetches of a table's data may be performed in parallel (using multiple threads), each thread may be assigned a range of the table that it will fetch from.

A fetching algorithm may divide a table into ranges according to one of the columns. In particular, the algorithm may analyze which column from the key is the most distinct one (referred to as the 'MostDistinctCol'). That is, the algorithm may determine which column/associated identifier contains the most number of distinct values. Next, the algorithm may create sizes of ranges. As one example, the algorithm might divide (ColumnMaxValOfMostDistinctCol−ColumnMinValOfMostDistinctCol) by (number of threads+1). In an eight thread system, for example, the spread of values (e.g., the maximum value of the most distinct column less the minimum value of that column) might be divided by 9. Each thread may then take ownership of a range and retrieve data from that range.

Turning again to FIG. 5, three columns/associated identifiers may be evaluated to determine which identifier is most appropriately used to define ranges within the table: Structure ID, Agency ID, and Record ID. Starting with Structure ID, it may be determined that the column is associated with 10 distinct values ("Count(Distinct)" in FIG. 5) that range from 0 as a minimum value to 100 as a maximum value. Assuming the system has 8 processing threads, the range size is calculated as $(100-0)/(8+1)=11.1111$. The number of ranges may be calculated as the number of distinct IDs divided by the number of ranges rounded up to the next whole integer (because there will be at least one range with one identifier). Thus, for Structure ID the number of ranges will be 1 (10/11.1111 rounded up). The number of IDs per range may be calculated as number of distinct IDs divided by the number of ranges rounded up to the next whole integer. Thus, for Structure ID the number of IDs per range will be 10 (10/1). Each ID is associated with 20,000 records (that is, the 200,000 total records divided by the number of distinct values) and the actual number of records in each range is the number of IDs in each range multiplied by the number of records per ID, or 200,000.

Now examining Agency ID, it may be determined that the column is associated with 5 distinct values that range from 0 as a minimum value to 20 as a maximum value. Assuming the system has 8 processing threads, the range size is calculated as $(20-0)/(8+1)=2.2222$. The number of ranges may be calculated as the number of distinct IDs divided by the number of ranges rounded up to the next whole integer (because there will be at least one range with one identifier). Thus, for Agency ID the number of ranges will be 3 (5/2.2222 rounded up). The number of IDs per range may be calculated as number of distinct IDs divided by the number of ranges rounded up to the next whole integer. Thus, for Agency ID the number of IDs per range will be 2 (5/3 rounded up). Each ID is associated with 40,000 records (that is, the 200,000 total records divided by the number of distinct values) and the actual number of records in each range is the number of IDs in each range multiplied by the number of records per ID, or 80,000.

Finally, with respect to Record ID, it may be determined that the column is associated with 50,000 distinct values that range from 0 as a minimum value to 50,001 as a maximum value. Assuming the system has 8 processing threads, the range size is calculated as (50,001−0)/(8+1)=5555.6667. The number of ranges may be calculated as the number of distinct IDs divided by the number of ranges rounded up to the next whole integer (because there will be at least one range with one identifier). Thus, for Record ID the number of ranges will be 3 (50,000/5555.6667 rounded up). The number of IDs per range may be calculated as number of distinct IDs divided by the number of ranges rounded up to the next whole integer. Thus, for Record ID the number of IDs per range will be 5,556 (50,000/9 rounded up). Each ID is associated with 4 records (that is, the 200,000 total records divided by the number of distinct values) and the actual number of records in each range is the number of IDs in each range multiplied by the number of records per ID, or 22,224.

If Structure ID was selected to be used to create ranges, the system would need to process 200,000 records in each fetch query. This could be costly on the both the server and application side. Instead, the algorithm may choose the column with the most distinct values (Record ID) which will use a fetch of a maximum of 22,224 records in each query. Thus, the algorithm may increase the efficiency of data fetching and improve system performance.

Figure 6:
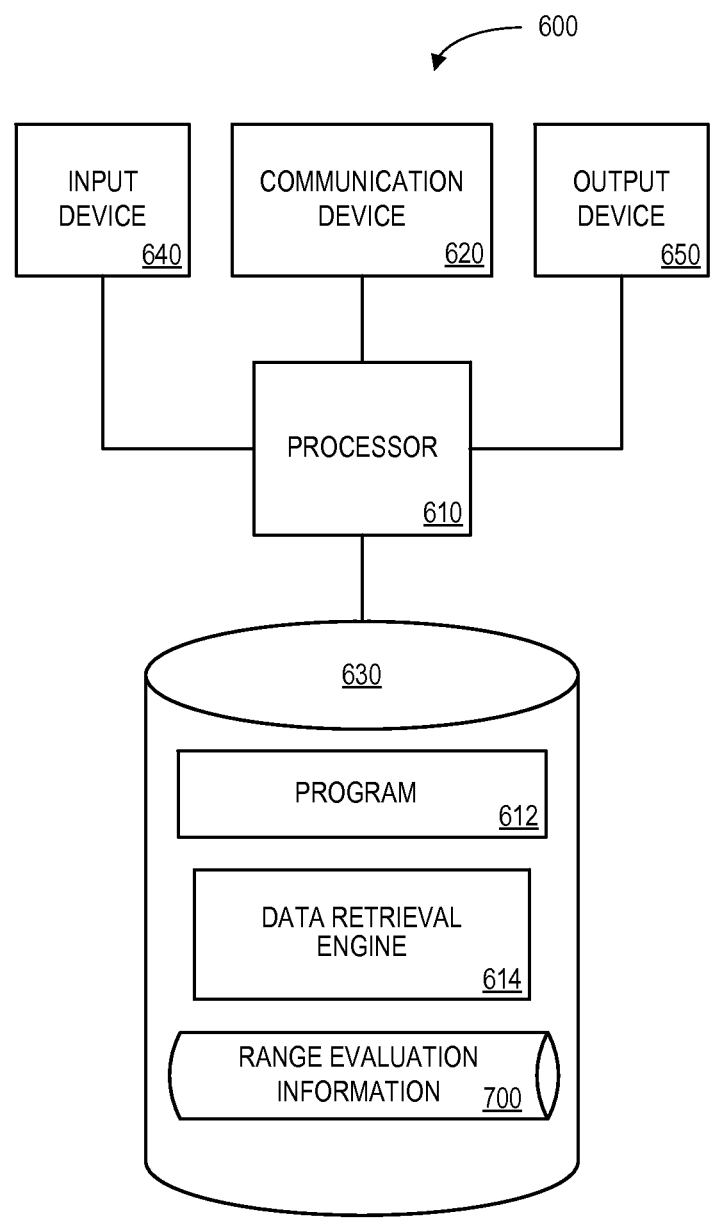
FIG. 6 is a block diagram of a system that might be associated according to some embodiments.

FIG. 6 is a block diagram overview of a data retrieval unit 600 according to some embodiments. The data retrieval unit 600 may be, for example, associated with any of the devices described herein. The data retrieval unit 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote data sources. The data retrieval unit 600 further includes an input device 640 (e.g., a mouse and/or keyboard to enter algorithm parameters) and an output device 650 (e.g., a computer monitor to display algorithm results).

The processor 610 communicates with a storage device 630. The storage device 630 may comprise any appropriate information storage device, including combinations of magnetic storage devices (e.g., a hard disk drive), optical storage devices, and/or semiconductor memory devices. The storage device 630 stores a program 612 and/or data retrieval engine application 614 for controlling the processor 610. The processor 610 performs instructions of the programs 612, 614, and thereby operates in accordance with any of the embodiments described herein. For example, the processor 610 may access a data source from which data will be retrieved via a plurality of processing threads. The data source may have, for example, a plurality of records with each record being associated with a plurality of identifiers. Each of the plurality of identifiers may be dynamically evaluated by the processor 610 as a potential range identifier, and the evaluation may be based at least in part on a number of distinct values present within each identifier. One of the potential range identifiers may be selected by processor 610 as a selected range identifier, and the plurality of records may be divided into ranges defined using the selected range identifier.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the data retrieval unit 600 from another device; or (ii) a software application or module within the data retrieval unit 600 from another software application, module, or any other source.

Figure 7:
FIG. 7 illustrates a portion of range evaluation information in accordance with some embodiments.

In some embodiments (such as shown in FIG. 6), the storage device 630 stores range evaluation information 700 (described with respect to FIG. 7). One example of a database 700 that may be used in connection with the data retrieval unit 600 will now be described in detail with respect to FIG. 7. Note that the databases described herein are examples, and additional and/or different information may be stored therein. Moreover, various databases might be split or combined in accordance with any of the embodiments described herein.

Referring to FIG. 7, a table is shown that represents the input records database 700 that may be stored at the data retrieval unit 600 according to some embodiments. The table may include, for example, entries identifying results associated with the retrieval of data from a data store. The table may also define fields 702, 704, 706, 708, 710 for each of the entries. The fields 702, 704, 706, 708, 710 may, according to some embodiments, specify: a data source identifier 702, a date and time 704, a selected identifier 706, a count of distinct values 708, and a result 710. The information in the input records database 700 may be created and updated, for example, whenever data is retrieved from a data store.

The data source identifier 702 might indicate the data source from which data was retrieved along with a date and time 704 when the data was retrieved. The selected identifier 706 might indicate, for example, the column name of the identifier that was selected to be used to define ranges within the data source, and the count may represented the number of distinct values 708 within the selected identifier 706. The result 710 might indicate, for example, how long it took to retrieve the data from the data source "DS_101." Note that at different times 704 different selected identifiers 706 could be used to define ranges in the data source (e.g., because the data within the table changed).

Thus, some embodiments may provide efficient methods of retrieving data from a data source using multiple processing threads.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of data, note that embodiments may be associated with other types of information. For example, sales orders, financial information, and health data may be processed in accordance with any of the embodiments described herein.

Moreover, while embodiments have been illustrated using particular series of steps, embodiments may be implemented in any other of a number of different ways. For example, some embodiments might dynamically adjust at least one range size after a portion of the data is retrieved from the ranges by the plurality of processing threads. For example, the adjustment may be based at least in part on an evaluation of the data retrieved from the data source. That is, additional improvements may be provided on top of the general algorithm described herein. For example, there differences in the records that are actually retrieved from the ranges (e.g., not all the records in a range may exist). If a certain thread retrieves the average amount of records plus an additional 10%, the current range could be divided into more ranges in order to prevent bottle necks. Similarly, in a system that has a data type that is "heavy" (takes a longer time to be retrieved), ranges having a lot of that data type may be made smaller to enable more parallelism.

Figure 8:
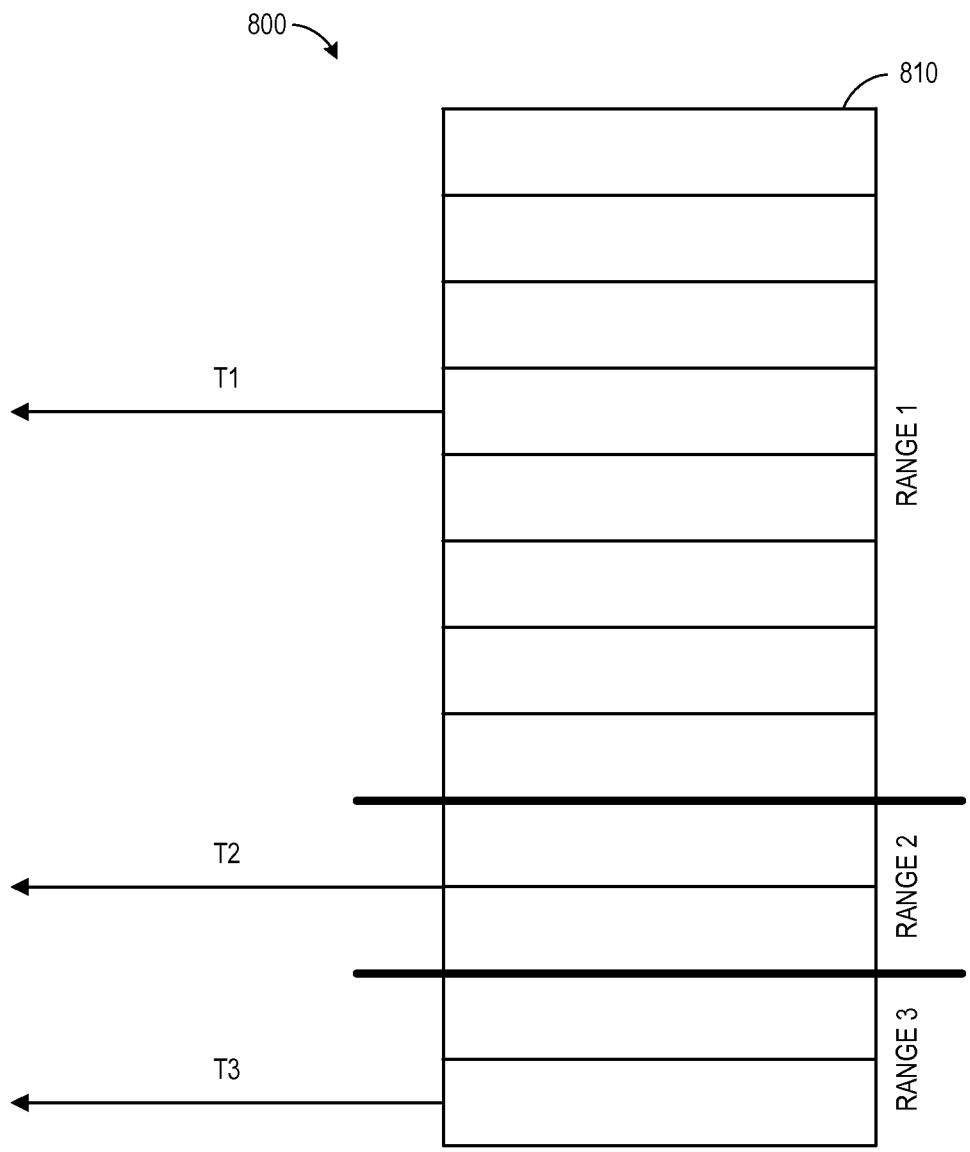
FIG. 8 illustrates a dynamic update of data source ranges according to some embodiments.

For example, FIG. 8 illustrates a dynamic update of data source ranges 800 according to some embodiments. In this case, it might have been determined that the original range 1 (as illustrated in FIG. 3) actually turns out to have quite a few empty records. As a result, range 1 has been made larger (and ranges 2 and 3 have fewer records 810). This may help all of the threads be efficiently utilized.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
    accessing a data source from which data will be retrieved via a plurality of processing threads, the data source having a plurality of records with each record being associated with a plurality of identifiers;
    dynamically evaluating each of the plurality of identifiers as a potential range identifier, wherein said evaluation is based at least in part on a number of distinct values present within each identifier;
    selecting one of the potential range identifiers as a selected range identifier;
    dividing the plurality of records into ranges defined using the selected range identifier; and
    calculating a range size for each of the ranges based on the number of distinct values, a maximum value associated with a potential range identifier, a minimum value associated with the potential range identifier and the number of processing threads, wherein the range size is rounded up to a next whole integer.

2. The method of claim 1, further comprising:
    assigning different processing threads to different ranges; and
    simultaneously retrieving the data from the ranges by executing the plurality of processing threads.

3. The method of claim 1, wherein said evaluation comprises selecting a potential range identifier having the largest number of distinct values as the selected range identifier.

4. The method of claim 1, wherein the data source comprises a table of business information and each of the plurality of potential range identifiers are associated with a table column.

5. The method of claim 4, wherein the data retrieval is associated with a backup operation for the business information.

6. The method of claim 1, further comprising:
    dynamically adjusting at least one range size after a portion of the data is retrieved from the ranges by the plurality of processing threads.

7. The method of claim 6, wherein said adjustment is based at least in part on an evaluation of the data retrieved from the data source.

8. The method of claim 1, wherein the range size for each of the ranges is calculated by the number of distinct values (the maximum value associated with the potential range identifier–a minimum value associated with the potential range identifier) divided by (the number of processing threads+1) rounded up to a next whole integer.

9. A non-transitory, computer-readable medium storing program code executable by a computer to:
    access a data source from which data will be retrieved via a plurality of processing threads, the data source having a plurality of records with each record being associated with a plurality of identifiers;
    dynamically evaluate each of the plurality of identifiers as a potential range identifier, wherein said evaluation is based at least in part on a number of distinct values present within each identifier;
    select one of the potential range identifiers as a selected range identifier; and
    divide the plurality of records into ranges defined using the selected range identifier; and
    calculate a range size for each of the ranges based on the number of distinct values, a maximum value associated with a potential range identifier, a minimum value associated with the potential range identifier and the number of processing threads, wherein the range size is rounded up to a next whole integer.

10. The medium of claim 9, further storing program code executable by the computer to:
    assign different processing threads to different ranges; and
    simultaneously retrieve the data from the ranges by executing the plurality of processing threads.

11. The medium of claim 9, wherein said evaluation comprises selecting a potential range identifier having the largest number of distinct values as the selected range identifier.

12. The medium of claim 9, wherein the data source comprises a table of business information and each of the plurality of potential range identifiers are associated with a table column.

13. The medium of claim 9, further storing program code executable by the computer to:
    dynamically adjusting at least one range size after a portion of the data is retrieved from the ranges by the plurality of processing threads.

14. A system, comprising:
    an data source having a plurality of records with each record being associated with a plurality of identifiers; and
    a data retrieval unit, associated with a plurality of processing threads, to:
    dynamically evaluate each of the plurality of identifiers as a potential range identifier, wherein said evaluation is based at least in part on a number of distinct values present within each identifier,
    select one of the potential range identifiers as a selected range identifier,
    dividing the plurality of records into ranges defined using the selected range identifier; and
    calculate a range size for each of the ranges based on the number of distinct values, a maximum value associated with a potential range identifier, a minimum value associated with the potential range identifier and the number of processing threads, wherein the range size is rounded up to a next whole integer.

15. The system of claim 14, wherein the data retrieval unit is further to:
    assign different processing threads to different ranges; and
    simultaneously retrieve the data from the ranges by executing the plurality of processing threads.

16. The system of claim 14, wherein the data retrieval unit is further to:

dynamically adjust at least one range size after a portion of the data is retrieved from the ranges by the plurality of processing threads.

* * * * *